US010456981B2

(12) United States Patent
Iwase et al.

(10) Patent No.: US 10,456,981 B2
(45) Date of Patent: Oct. 29, 2019

(54) THREE-DIMENSIONAL PRINTING DATA GENERATION DEVICE, AND THREE-DIMENSIONAL PRINTING SYSTEM INCLUDING THE SAME

(71) Applicant: Roland DG Corporation, Hamamatsu-shi, Shizuoka (JP)

(72) Inventors: Fumiyoshi Iwase, Hamamatsu (JP); Akihiro Yamamoto, Hamamatsu (JP); Tetsuhiro Kunifuji, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 82 days.

(21) Appl. No.: 15/299,904

(22) Filed: Oct. 21, 2016

(65) Prior Publication Data
US 2017/0113413 A1    Apr. 27, 2017

(30) Foreign Application Priority Data

Oct. 22, 2015   (JP) ................................. 2015-207732

(51) Int. Cl.
| | | |
|---|---|---|
| *B29C 64/386* | (2017.01) | |
| *B29C 64/40* | (2017.01) | |
| *B29C 64/165* | (2017.01) | |
| *B33Y 30/00* | (2015.01) | |
| *B33Y 50/00* | (2015.01) | |
| *G06F 16/22* | (2019.01) | |

(52) U.S. Cl.
CPC .......... *B29C 64/386* (2017.08); *B29C 64/165* (2017.08); *B29C 64/40* (2017.08); *B33Y 30/00* (2014.12); *B33Y 50/00* (2014.12); *G06F 16/22* (2019.01)

(58) Field of Classification Search
CPC ... B29C 64/40; B29C 67/0088; B29C 64/386; B29C 64/20; B29C 64/165; B33Y 50/00; B33Y 30/00; G06F 17/30312; G06T 17/00; G06T 19/00
See application file for complete search history.

(56) References Cited

U.S. PATENT DOCUMENTS

| | | | |
|---|---|---|---|
| 9,789,540 B2 * | 10/2017 | Illston | .................. B22F 3/1055 |
| 2006/0099287 A1 | 5/2006 | Kim et al. | |

(Continued)

FOREIGN PATENT DOCUMENTS

| | | |
|---|---|---|
| JP | 05-305672 A | 11/1993 |
| JP | 09-1675 A | 1/1997 |

(Continued)

*Primary Examiner* — Anthony Calandra
*Assistant Examiner* — Jerzi H Moreno Hernandez
(74) *Attorney, Agent, or Firm* — Keating & Bennett, LLP

(57) ABSTRACT

A three-dimensional printing data generation device includes a storage storing data of a three-dimensional target object model, a support model generation processor generating, based on the data stored in the storage, data of a three-dimensional support model including a substrate portion located below the target object model and a handle portion extending upward from the substrate portion, the substrate portion including a through-hole larger than a particle diameter of a powder material, and an output processor outputting the data of the target object model and the data of the support model as three-dimensional printing data.

13 Claims, 7 Drawing Sheets

(56) References Cited

U.S. PATENT DOCUMENTS

| | | | | |
|---|---|---|---|---|
| 2007/0126157 A1* | 6/2007 | Bredt | B33Y 40/00 264/334 |
| 2010/0042241 A1* | 2/2010 | Inoue | A61C 13/0004 700/97 |
| 2011/0190446 A1* | 8/2011 | Matsui | B33Y 10/00 525/56 |
| 2012/0018926 A1* | 1/2012 | Mannella | B33Y 30/00 264/500 |
| 2012/0113439 A1* | 5/2012 | Ederer | B22F 1/0059 358/1.9 |
| 2013/0241095 A1* | 9/2013 | Korten | A61C 13/0018 264/16 |
| 2013/0307193 A1* | 11/2013 | Johnson | C09J 129/04 264/401 |
| 2015/0066178 A1* | 3/2015 | Stava | B29C 67/0088 700/98 |
| 2015/0151493 A1* | 6/2015 | Schmidt | B29C 67/0092 700/98 |
| 2015/0151494 A1* | 6/2015 | Eggers | G06T 17/10 700/120 |
| 2015/0210016 A1* | 7/2015 | Okamoto | B29C 64/40 428/206 |
| 2015/0360421 A1* | 12/2015 | Burhop | G05B 19/4099 264/401 |
| 2016/0075084 A1* | 3/2016 | Sakura | B33Y 10/00 264/113 |
| 2016/0200051 A1* | 7/2016 | Urbanic | B29C 67/0088 264/308 |
| 2016/0368224 A1* | 12/2016 | Ooba | B22F 3/008 |
| 2017/0014907 A1* | 1/2017 | Ng | B22F 3/1055 |
| 2017/0326789 A1* | 11/2017 | Kimblad | B29C 64/165 |
| 2018/0001381 A1* | 1/2018 | Kimblad | B22F 3/008 |

FOREIGN PATENT DOCUMENTS

| | | |
|---|---|---|
| JP | 2004-291625 A | 10/2004 |
| JP | 2006-137173 A | 6/2006 |

\* cited by examiner

THREE-DIMENSIONAL PRINTING DATA GENERATION DEVICE, AND THREE-DIMENSIONAL PRINTING SYSTEM INCLUDING THE SAME

CROSS REFERENCE TO RELATED APPLICATIONS

The present application claims priority to Japanese Patent Application No. 2015-207732 filed on Oct. 22, 2015, which is incorporated by reference herein in its entirety.

BACKGROUND OF THE INVENTION

1. Field of the Invention

The present invention relates to a three-dimensional printing data generation device creating image data of a three-dimensional object, and a three-dimensional printing system including the same.

2. Description of the Related Art

Three-dimensional printing devices creating a three-dimensional object are conventionally known. Such a three-dimensional printing device creates data (slice data) representing a three-dimensional object to be printed that is in a state of being sliced at a predetermined interval, sequentially forms cross-sectional models corresponding to the slice data, and stacks the cross-sectional models. Thus, the three-dimensional object is printed.

Known printing methods usable by a three-dimensional printing device include powder stack printing, thermal fusion stack printing, optical printing and the like. For example, Japanese Laid-Open Patent Publication No. 2006-137173 discloses a three-dimensional printing device using a powder stack printing method. This three-dimensional printing device includes a printing table and a binder supply head. A top surface of the printing table is covered with a powder material to a thickness of a cross-sectional model corresponding to the slice data. Based on the slice data, the binder supply head injects a binder while appropriately moving with respect to the printing table. In an area to which the binder is injected, the powder material is selectively solidified. As a result, a powder material layer corresponding to the slice data is formed. When one powder material layer is formed, the printing table is lowered in a height direction of the printing table by the thickness of the cross-sectional model corresponding to the slice data. A space made by the downward movement of the printing table is supplied with the powder material. Such an operation is repeated to stack the powder material layers in the height direction of the printing table. Thus, a three-dimensional object having a desired shape is printed.

When the printing is finished by such a three-dimensional printing device, the three-dimensional object is buried in the powder material that has not been solidified. Therefore, the user needs to dig out the desired three-dimensional object from the unsolidified powder material. However, the user cannot accurately find the exact position in the powder material where the three-dimensional object is buried. This occasionally makes the operation of picking up the three-dimensional object time-consuming. In addition, while the user is searching for the three-dimensional object with no clue or is attempting to remove the unsolidified powder material in a hurry, the three-dimensional object is occasionally broken inadvertently.

SUMMARY OF THE INVENTION

Preferred embodiments of the present invention provide a three-dimensional printing data generation device creating image data that allows a desired three-dimensional object to be picked up easily from an unsolidified powder material and also allows the powder material and the desired three-dimensional object to be easily separated from each other (allows the desired three-dimensional object to be easily de-powdered), and a three-dimensional printing system including such a three-dimensional printing data generation device.

A three-dimensional printing data generation device according to a preferred embodiment of the present invention generates three-dimensional printing data usable for a three-dimensional printing device of a powder stack printing type. The three-dimensional printing data generation device includes a storage that stores data of a three-dimensional target object model representing a three-dimensional object as a printing target; a support model generation processor configured or programmed to generate, based on the data stored in the storage, data of a three-dimensional support model including a substrate portion located below the target object model and a handle portion extending upward from the substrate portion, the substrate portion being provided with a through-hole larger than a particle diameter of a powder material; and an output processor outputting the data of the target object model and the data of the support model as the three-dimensional printing data.

The above-described three-dimensional printing data generation device generates three-dimensional printing data usable to form a desired three-dimensional object and also a support. The support includes a substrate portion located below the target object model and a handle portion extending upward from the substrate portion. The substrate portion is provided with a through-hole larger than a particle diameter of a powder material. With such an arrangement, when the user lifts up the support while holding the handle portion of the support after the printing of the three-dimensional object is finished, the printed three-dimensional object is supported by the substrate portion whereas the unsolidified powder material falls down through the through-holes in the substrate portion. Therefore, the three-dimensional object is pulled up from the unsolidified powder material and is easily separated from powder material (is easily de-powdered).

A three-dimensional printing system according to a preferred embodiment of the present invention includes the above-described three-dimensional printing data generation device; and a three-dimensional printing device. The three-dimensional printing system allows the printed three-dimensional object to be picked up easily. Therefore, the convenience for the user is improved.

Various preferred embodiments of the present invention provide three-dimensional printing data generation devices generating three-dimensional printing data allowing a three-dimensional object to be smoothly picked up and de-powdered while reducing the risk of the three-dimensional object being destroyed, and three-dimensional printing systems including such a three-dimensional printing data generation device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, three-dimensional printing systems including three-dimensional printing data generation devices according to preferred embodiments of the present invention will be described with reference to the drawings when necessary. The preferred embodiments of the present invention described below are not intended to limit the present invention in any way. Elements and sites having identical functions bear identical reference signs, and the same descriptions may be omitted appropriately or simplified.

Figure 1:
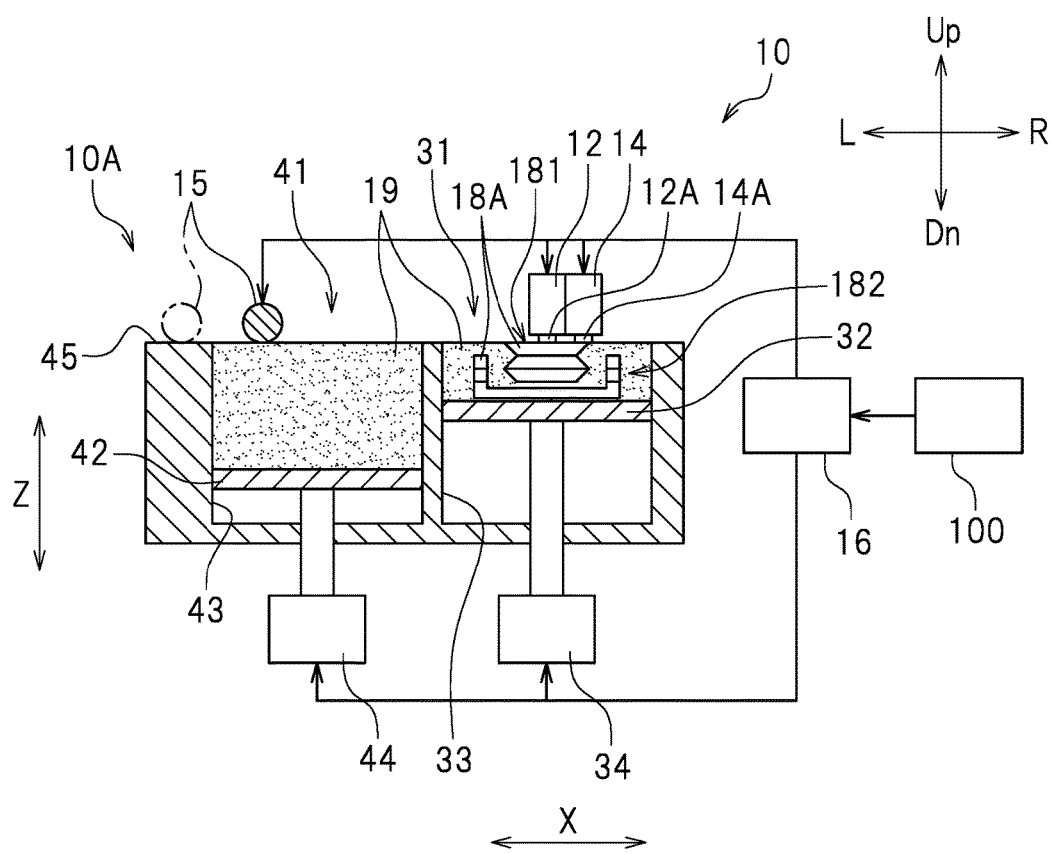
FIG. 1 is a cross-sectional view of a three-dimensional printing system according to a preferred embodiment of the present invention.
Figure 2:
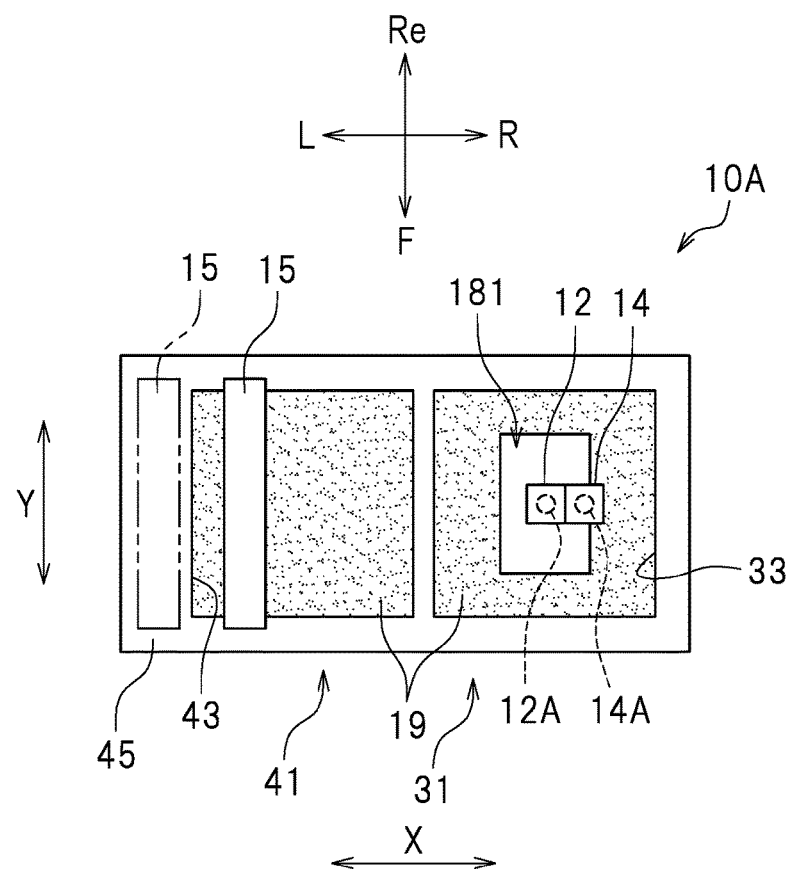
FIG. 2 is a plan view of a three-dimensional printing device according to a preferred embodiment of the present invention.

First, a three-dimensional printing system 10 according to a preferred embodiment of the present invention will be described. FIG. 1 is a cross-sectional view of the three-dimensional printing system 10 according to the present preferred embodiment. The three-dimensional printing system 10 is a device creating a desired three-dimensional object 181 and also a support 182. The three-dimensional printing system 10 includes a three-dimensional printing device 10A and a three-dimensional printing data generation device 100. FIG. 2 is a plan view of the three-dimensional printing device 10A according to a preferred embodiment of the present invention. In the figures, letters F, Re, L, R, Up and Dn respectively represent front, rear, left, right, up and down. These directions are provided merely for the sake of convenience, and do not limit the form of installation of the three-dimensional printing system 10 in any way.

The three-dimensional printing device 10A is a device printing a color three-dimensional object by forming and stacking a great number of powder material layers 18A. In this example, the desired three-dimensional object 181 and also the support 182 corresponding to the three-dimensional object 181 are printed. The support 182 assists pick up of the desired three-dimensional object 181. The three-dimensional printing device 10A includes a printing processor 31, a powder material supply 41, a binder supply head 12, an ink head 14, and a controller 16.

The printing processor 31 includes a printing tank 33, a printing table 32 and a table elevator 34. The printing tank 33 accommodates a powder material 19. The powder material 19 is supplied from the powder material supply 41. The powder material 19 covers a top surface of the printing table 32 provided in the printing tank 33 with a predetermined thickness (e.g., about 0.1 mm) based on the slice data. The powder material 19 is solidified with a binder to form the powder material layers 18A. The powder material 19 may be formed of, for example, gypsum, a ceramic material (e.g., metal oxide such as silica, alumina or the like), a metal material, a plastic material or the like. The printing table 32 is movable in an up-down direction in the printing tank 33. The printing table 32 is electrically connected with the table elevator 34. The table elevator 34 is provided to move the printing table 32 in the up-down direction. The table elevator 34 is not specifically limited to any specific mechanism, and preferably is a cylinder mechanism in this example.

When the powder material 19 is solidified and one powder material layer 18A is formed on the printing table 32, the table elevator 34 moves (lowers) the printing table 32 down by a predetermined distance. The downward moving distance of the printing table 32 is predefined based on a thickness of a cross-sectional model corresponding to the slice data. A space made by the downward movement of the printing table 32 is filled with the powder material 19. These steps are sequentially repeated to stack the powder material layers 18A in a height direction of the printing table 32. As a result, the shape of the desired powder material layers 18A is formed.

The powder material supply 41 is provided to supply the powder material 19 to the printing processor 31. The powder material supply 41 includes a powder material supply tank 43, a powder material supply table 42, a table elevator 44, and a powder material supply roller 15. The powder material supply tank 43 accommodates the powder material 19. The powder material supply table 42 is movable in the powder material supply tank 43 in the up-down direction. The powder material supply table 42 is electrically connected with the table elevator 44. The table elevator 44 is provided to move the powder material supply table 42 in the up-down direction. The table elevator is not specifically limited to any specific mechanism, and preferably is a cylinder mechanism in this example.

The powder material supply roller 15 supplies the powder material 19 accommodated in the powder material supply tank 43 to the printing tank 33. The powder material supply roller 15 is movable by a motor (not shown) in a left-right direction on a surface of the powder material supply tank 43 and a surface of the printing tank 33. When not being used, the powder material supply roller 15 is located on a roller carrying area 45 provided at one end (left end in FIG. 1 and FIG. 2) of the powder material supply 41. When the powder material supply table 42 is moved upward by the table elevator 44, the powder material supply roller 15 moves in a predetermined direction (rightward in FIG. 1 and FIG. 2) from the roller carrying area 45. As a result, a predetermined amount of the powder material 19 accommodated in the powder material supply tank 43 is pressed by the powder material supply roller 15 and supplied to the printing tank 33. The movement of the powder material supply roller 15 on the printing tank 33 flattens the top surface of the printing tank 33. In this manner, the powder material 19 is provided to cover the printing table 33 uniformly with a predetermined thickness. The powder material supply roller 15, when arriving at the end of the printing tank 33 opposite to the powder material supply 41, is rotated in an opposite direction (counterclockwise direction in FIG. 1 and FIG. 2) to return to the roller carrying area 45.

When the powder material 19 is supplied from the powder material supply tank 43 to the printing tank 33, the table elevator moves (raises) the powder material supply table 42 by a predetermined distance. The upward moving distance of the powder material supply table 42 is predefined in correspondence with the downward moving distance of the printing table 32. In this preferred embodiment, the upward moving distance of the powder material supply table 42 preferably is equal or approximately equal to the downward moving distance of the printing table 32.

The binder supply head 12 is provided to atomize the binder toward the powder material 19 in the printing tank 33. The binder supply head 12 is electrically connected with a driver (not shown) and is movable in a front-rear direction (also referred to as an "X axis direction") and the left-right direction (also referred to as a "Y axis direction") with respect to the printing tank 33. The binder supply head 12 includes a nozzle 12A injecting the binder. The nozzle 12A is in communication with a binder accommodation tank (not shown). The binder may be any material capable of fixing particles of the powder material 19 to each other, with no specific limitation. The binder may be, for example, a water-soluble organic polymer compound. The binder supply head 12 atomizes the binder based on the slice data. As a result, a portion of the powder material 19 that is in an area to which the binder is atomized is solidified to form the powder material layer 18A.

The ink head 14 is provided to atomize colored ink toward the powder material layer 18A formed of the powder material 19 solidified with the binder. The ink head 14 atomizes the ink toward the powder material layer 18A based on color data included in the slice data. The ink head 14 is electrically connected with a driver (not shown) and is movable in the front-rear direction (X axis direction) and the left-right direction (Y axis direction) with respect to the printing tank 33. The ink head 14 includes a nozzle 14A injecting the ink. The nozzle 14A is in communication with a plurality of ink accommodation tanks (not shown). In this preferred embodiment, the binder supply head 12 and the ink head 14 are extended coaxially in the X axis direction and formed integrally. Alternatively, the binder supply head 12 and the ink head 14 may be separate from each other.

An overall operation of the three-dimensional printing device 10A is controlled by the controller 16. The controller 16 is electrically connected with the binder supply head 12, the ink head 14, the powder material supply roller 15, the table elevators 34 and 44, and the three-dimensional printing data generation device 100. The controller 16 is configured and/or programmed to drive the table elevator 34 to move the printing table 32 upward or downward (the up-down direction is also referred to as a "Z axis direction"). The controller 16 is configured and/or programmed to drive the table elevator 44 to move the powder material supply table 42 upward or downward (Z axis direction). The controller 16 is configured and/or programmed to control the injection of the binder from the binder supply head 12 and the movement of the binder supply head 12 in the X axis direction and the Y axis direction. The controller 16 is configured and/or programmed to control the injection of the ink from the ink head 14 and the movement of the ink head 14 in the X axis direction and the Y axis direction. The controller 16 is configured and/or programmed to control the movement of the powder material supply roller 15.

Three-dimensional printing data is input to the controller 16 from the three-dimensional printing data generation device 100. The controller 16 creates slice data from the input three-dimensional printing data. The slice data represents the three-dimensional object 181, which is a printing target, and the support 182 corresponding to the three-dimensional object 181, in the state of being sliced in a predetermined direction at a predetermined interval. The direction in which the three-dimensional object 181 and the support 182 are sliced may be a horizontal direction or a vertical direction. The three-dimensional printing device 10A forms the powder material layer 18A based on the slice data. There is no specific limitation on the structure of the controller 16. The controller 16 may be, for example, a computer, and may include a CPU (central processing unit) executing commands from a control program, a ROM (read only memory) storing the program to be executed by the CPU, a RAM (random access memory) usable as a working area where the program is to be developed, and a storage (storage medium) storing the program and various data, such as a memory or the like.

Figure 3:
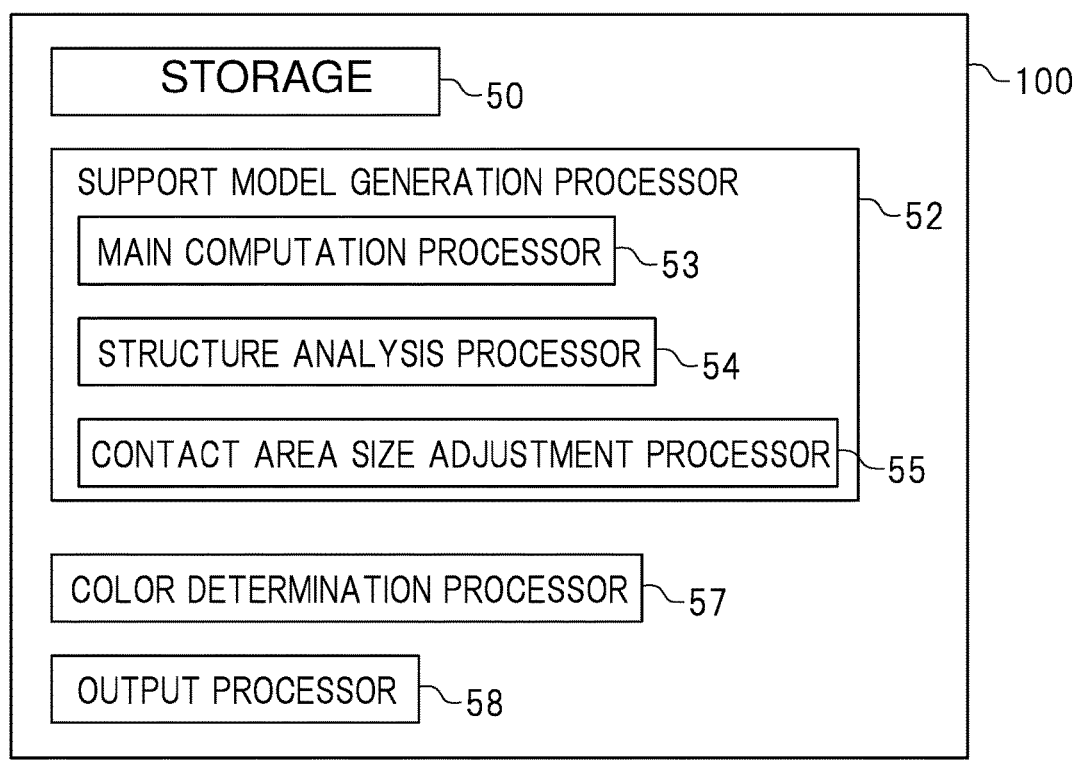
FIG. 3 is a block diagram of a three-dimensional printing data generation device according to a preferred embodiment of the present invention.

Now, the three-dimensional printing data generation device 100 according to a preferred embodiment of the present invention will be described. The three-dimensional printing data generation device 100 is provided to create three-dimensional printing data usable by the three-dimensional printing device 10A. FIG. 3 is a block diagram of the three-dimensional printing data generation device 100 according to a preferred embodiment of the present invention. The three-dimensional printing data generation device 100 includes a storage 50, a support model generation processor 52, a color determination processor 57, and an output processor 58. The support model generation processor 52 includes a main computation processor 53, a structure analysis processor 54, and a contact area size adjustment processor 55. The three-dimensional printing data generation device 100 may be separate from, or may be built in, the three-dimensional printing device 10A. There is no specific limitation on the structure of the three-dimensional printing data generation device 100. The three-dimensional printing data generation device 100 may be, for example, a computer and configured and/or programmed to have an operation thereof controlled by a CPU. The three-dimensional printing data generation device 100 may include, in addition to the CPU, a read only memory (ROM) storing, for example, a program to be executed by the CPU, a random access memory (RAM) usable as, for example, a working area of the CPU, and the like.

The three-dimensional printing data generation device 100 may be a program (computer program) causing a CPU of a computer to operate as the three-dimensional printing data generation device 100. Such a program may be stored in a non-transitory computer readable medium that stores an operation of the three-dimensional printing data generation device 100. The storage medium may be, for example, a semiconductor storage medium (e.g., ROM, nonvolatile memory card), an optical storage medium (e.g., DVD, MO, MD, CD, BD), a magnetic storage medium (e.g., magnetic tape, flexible disc), or the like. The program causing a CPU of a computer to operate as the three-dimensional printing data generation device 100 may be stored in the above-described storage medium or transmitted to a server computer via a network such as the Internet or the like. In this case, the server computer also defines a preferred embodiment of the present invention disclosed herein.

Alternatively, the three-dimensional printing data generation device 100 may be a circuit having the same or substantially the same function as that of the program. In this case, the storage 50, the support model generation processor 52, the color determination processor 57, and the output processor 58 may be respectively replaced with a storage circuit 50, a support model generation circuit 52, a color determination circuit 57, and an output circuit 58. The main computation processor 53, the structure analysis processor 54, and the contact area size adjustment processor 55 may be respectively replaced with a main computation circuit 53, a structure analysis circuit 54, and a contact area size adjustment circuit 55.

Figure 4A:
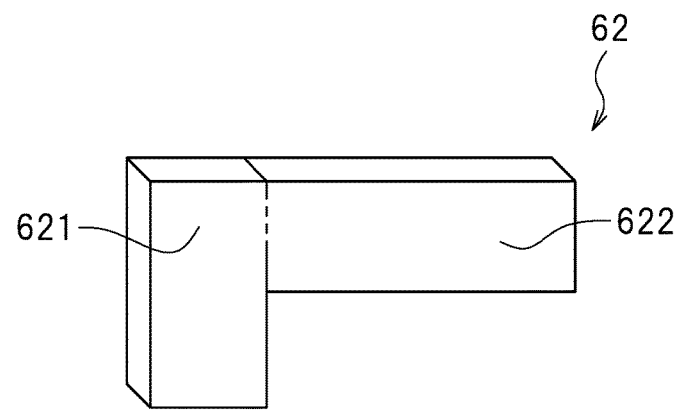
FIG. 4A shows an example of a target object model of three-dimensional printing data generated by a three-dimensional printing data generation device according to a preferred embodiment of the present invention.

The storage 50 stores attribute data of the (desired) three-dimensional object 181 to be printed by the three-dimensional system 10 (hereinafter, the attribute data of the three-dimensional object 181 will be referred to as "target object model"). FIG. 4A shows an example of target object model 62 stored in the storage 50. The target object model 62 is, for example, read onto the storage 50 from a storage medium or another computer (not shown) by, for example, an operation performed by a user. The target object model 62 includes at least three-dimensional spatial data of the shape or the size. The spatial data is represented by, for example, STL (STereo Lithography) data. In this preferred embodiment, the target object model 62 also includes color data. The color data is represented by, for example, RGB values. The target object model 62 shown in FIG. 4A includes a prism portion 621 and an overhung portion 622 protruding in a horizontal direction (perpendicular to the height direction) from the prism portion 621.

Figure 4B:
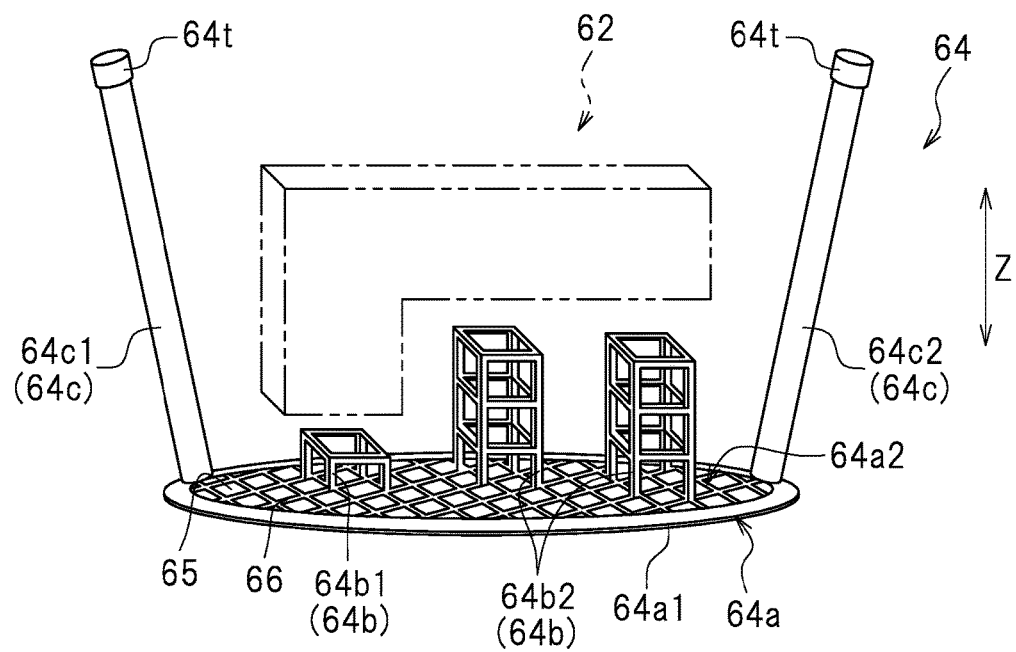
FIG. 4B shows an example of a support model of three-dimensional printing data generated by a three-dimensional printing data generation device according to a preferred embodiment of the present invention.

The support model generation processor 52 includes the main computation processor 53. The main computation processor 53 is configured and/or programmed to generate attribute data of the support 182 (hereinafter, the attribute data of the support 182 will be referred to as a "support model") based on the data of the target object model 62 stored in the storage 50. FIG. 4B shows an example of support model 64 generated by the main computation processor 53. The main computation processor 53 is configured and/or programmed to generate, for example, a plurality of support models 64 or one support model 64. The main computation processor 53 is configured and/or programmed to generate the support model(s) 64 in consideration of, for example, the shape or the size of the three-dimensional printing device 10A (specifically, the printing tank 33 or printing table 32) to be used for the printing. The type or the form of the information included in each support model 64 may be the same or substantially the same as that of the target object model 62 described above.

The support model 64 is used to generate a member assisting the pick up of the target object (pick up assisting member). The support model 64 includes a substrate portion 64a, and handle portions 64c extending upward from the substrate portion 64a. In this preferred embodiment, the support model 64 also includes support pillar portions 64b. The substrate portion 64a and the handle portions 64c are coupled with each other, and the substrate portion 64a and the support pillar portions 64b are coupled with each other. The support model 64 preferably is integrally formed. In the gravitational direction, the substrate portion 64a is generated below the target object model 62. The substrate portion 64a is a member supporting the target object model 62. In this preferred embodiment, the support model 64 and the target object model 62 are located at discrete positions from, and are out of contact with, each other. Thus, the three-dimensional object 181 and the support 182 are generated as separate three-dimensional items. Herein, the term "support" refers to a state where at least a part of the three-dimensional object 181 is located above the support 182. The term "support" encompasses a state where the three-dimensional object 181 is entirely placed on the support 182 and also a state where, for example, the three-dimensional object 181 is hung on the support 182 so as not to fall down.

The substrate portion 64a is located below the target object model 62. The substrate portion 64a is provided with through-holes 65, each of which is larger than the particle diameter of the particles of the powder material 19 (hereinafter, referred to simply as the "particle diameter of the powder material 19"). More specifically, in this example, the through-holes 65 are each rhombic as seen in a plan view, and the shorter diagonal of each of the through-holes 65 is longer than the particle diameter of the powder material 19. The shape, the size, the thickness and the like of the substrate portion 64a are determined in consideration of, for example, the center of gravity, the density balance and the like of the target object model 62. The center of gravity, the density balance and the like of the target object model 62 are detected and grasped by a conventionally known program. In this preferred embodiment, a surface of the substrate portion 64a that faces the target object model 62 is generated to have an area size larger than that of a surface of the target object model 62 that faces the substrate portion 64a. In this example, the substrate portion 64a is elliptical as seen in a plan view. The substrate portion 64a may have, for example, a circular shape or a polygonal shape such as a quadrangular shape, a rhombic shape or the like as seen in a plan view.

It is preferable that the substrate portion 64a is sufficiently strong to lift, while supporting, the target object model 62. In this preferred embodiment, the substrate portion 64a includes an annular outer frame portion 64a1 having a constant or substantially constant width and a mesh portion 64a2 located inner to the outer frame portion 64a1. The mesh portion 64a2 is provided with the plurality of through-holes 65 and preferably has a so-called "sieve" shape. In this example, the through-holes 65 preferably are rhombic as seen in a plan view. The through-holes 65 may have, for example, an elliptical shape or a polygonal shape other than a rhombic shape as seen in a plan view.

The through-holes 65 extend through the support model 64 in the height direction (Z axis direction). The through-holes 65 are formed to be larger than the preset particle diameter of the powder material 19 (e.g., about 50% volume-based cumulative average particle diameter ($D_{50}$) or about 95% volume-based cumulative particle diameter ($D_{95}$)). It is preferable that the through-holes 65 are formed to be at least about ten times as large as, for example, about 100 times as large as the particle diameter of the powder material 19. The number of the through-hole(s) 65 may be, for example, one, two or more, or ten or more. The through-holes 65 may be formed in the entirety of the substrate portion 64a or in a portion of the substrate portion 64a (in FIG. 4B, formed in the mesh portion 64a2).

The mesh portion 64a2 includes a plurality of linear portions 66. The through-holes 65 are demarcated by the linear portions 66. There is no specific limitation on the shape of the transverse plane of the linear portions 66. The transverse plane of the linear portions 66 may be, for example, circular, elliptical, quadrangular, rhombic or the like. In a state where the support 182 supports the three-dimensional object 181, a load is applied to the mesh portion 64a2 from above. In order to increase the load strength of the support 182, the linear portions 66 may have a transverse plane that is longer in the up-down direction than in the left-right direction and in the front-rear direction. For example, the linear portions 66 may have a transverse plane having a rhombic or elliptical shape longer in the up-down direction.

The support pillar portions 64b are generated above the substrate portion 64a and below the target object model 62. The support pillar portions 64b are members that stabilize the state where the target object model 62 is supported by the support model 64. When the printing is finished, the support pillar portions 64b of the support 182 are present below the three-dimensional object 181 as being discrete from, and thus out of contact with, the three-dimensional object 181. In this preferred embodiment, a support pillar portion 64b1 is generated below the prism portion 621. A plurality of support pillar portions 64b2 are generated below the overhung portion 622. The support pillar portions 64b1 and 64b2 are each in communication with the substrate portion 64a and extend from the substrate portion 64a toward the target object model 62. The support pillar portions 64b2 are preferably longer in the up-down direction than the support pillar portion 64b1 in order to stably support the overhung portion 622. There is no specific limitation on the shape of the support pillar portions 64b1 and 64b2. The support pillar portions 64b1 and 64b2 may be, for example, cylindrical, prism-shaped (for example, quadrangular prism-shaped or hexagonal prism-shaped), conical, polygonal pyramid-shaped, or the like. In FIG. 4B, the support pillar portion 64b1 and the support pillar portions 64b2 are both quadrangular prism-shaped.

The support pillar portions 64b may be, or may not be, provided with the through-holes 65. In other words, the through-holes 65 may be generated in only the substrate portion 64a of the support model 64 or may be generated in both of the substrate portion 64a and the support pillar portions 64b of the support model 64. In this preferred embodiment, the support pillar portions 64b are provided with the through-holes 65.

The handle portions 64c are generated above the substrate portion 64a and to the side of the target object model 62. The user may hold the handle portions 64c to remove the support 182 from the printing tank 33 or de-powder the three-dimensional object 181. The handle portions 64c extend upward from the outer frame portion 64a1 of the substrate portion 64a. In this preferred embodiment, the handle portions 64c include a first rod 64c1 and a second rod 64c2. The two handle portions 64c1 and 64c2 are located at an equal or substantially equal interval on a circumference of the outer frame portion 64a1. In other words, the second rod 64c2 is located at the opposite position to the first rod 64c1 with respect to the target object model 62 as seen in a plan view. There is no specific limitation in the shape of the handle portions 64c. The handle portions 64c may have any shape so that the user can easily hold the handle portions 64c. In this example, the handle portions 64c1 and 64c2 are preferably elongated rod-shaped.

The length in the height direction (vertical length) of the handle portions 64c1 and 64c2 may be greater than, or equivalent to, the length in the height direction (vertical length) of the target object model 62. With such an arrangement, in a state where the three-dimensional object 181 is supported by the support 182, top ends of the handle portions 64c1 and 64c2 are at a level higher than, or equivalent to, the level of a top end of the target object model 62. As a result, when the printing is finished, the top end of the support 182 is located in a surface region of the unsolidified powder material 19. In this preferred embodiment, the length of the handle portions 64c1 and 64c2 in the height direction is greater than the length of the target object model 62 in the height direction. This allows the support 182 buried in the powder material 19 to be found quickly when the printing is finished.

The three-dimensional object 181 printed by the three-dimensional printing device 10A may occasionally be baked at a temperature higher than the melting point of the powder material 19 to sinter the particles of the powder material 19, for the purpose of improving the strength of the three-dimensional object 181. During this operation, when the temperature of the three-dimensional object 181 reaches the melting point of the binder used to fix the particles of the powder material 19 to each other or the melting point of the powder material 19 itself, the three-dimensional object 181 is softened and is easily influenced by the weight of the three-dimensional object 181 itself. Therefore, in the case where the three-dimensional object 181 including a portion significantly influenced by the weight thereof, for example, an overhung portion or the like is baked, it is preferable that the three-dimensional object 181 is baked while being provided with a support that supports such a portion significantly influenced by the weight thereof. This prevents the three-dimensional object 181 from being deformed (especially, in the height direction).

Therefore, in a preferred embodiment of the present invention, the support model generation processor 52 includes the structure analysis processor 54 in addition to the main computation processor 53. The structure analysis processor 54 allows the support 182 to have both of the above-described function of assisting the pick up of the three-dimensional object 181 and a function of preventing the obtained three-dimensional object 181 from being deformed when being baked. The structure analysis processor 54 is configured and/or programmed to generate the support model 64 such that the three-dimensional object 181 is maintained in a predetermined shape against the weight thereof during baking, namely, the support model 64 as a deformation preventing member. This appropriately prevents the three-dimensional object 181 from being deformed by the weight thereof, and thus provides a sintered body that is better maintained in a desired shape.

Figure 5A:
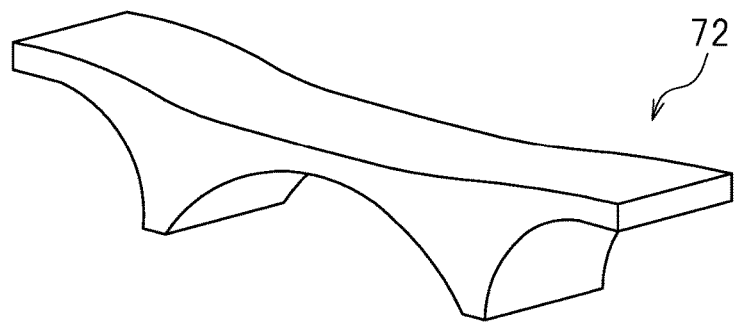
FIG. 5A shows an example of a target object model used for a method for generating a support model according to a preferred embodiment of the present invention.
Figure 5B:
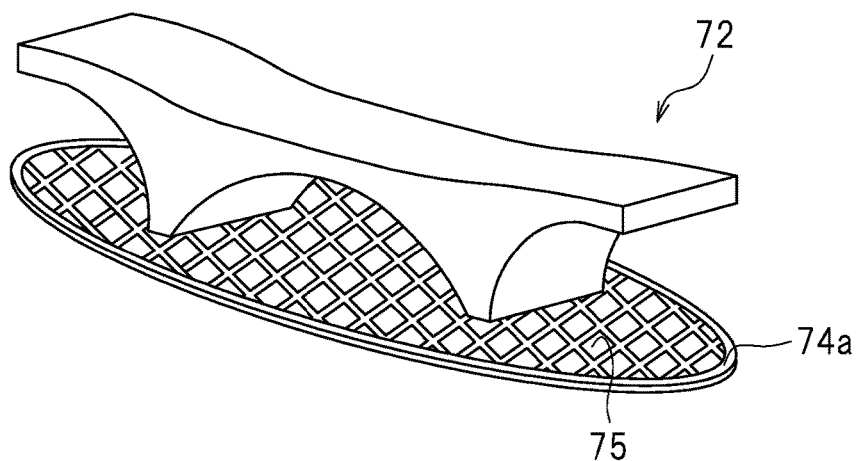
FIG. 5B shows an example of a position of a substrate portion with respect to a target object model in a method for generating a support model according to a preferred embodiment of the present invention.
Figure 5C:
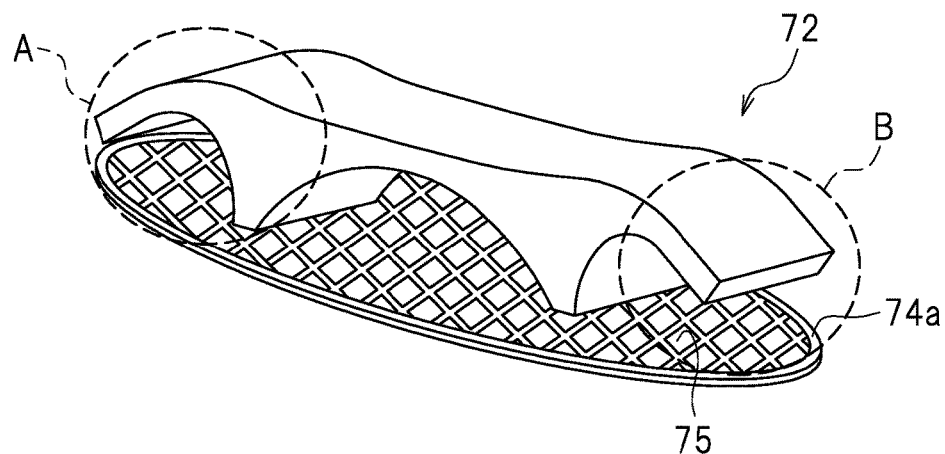
FIG. 5C shows the results of a displacement analysis performed for the first time in a method for generating a support model according to a preferred embodiment of the present invention.

FIG. 5A to FIG. 5C and FIG. 6A to FIG. 6C show a method for generating a support model 74 effective to prevent the three-dimensional object 181 from being deformed by the weight thereof during baking. In this example, a target object model 72 shown in FIG. 5A is stored in the storage 50. First, the main computation processor 53 generates a substrate portion 74a below the target object model 72 (see FIG. 5B). The substrate portion 74a is provided with through-holes 75, each of which is larger than the particle diameter of the powder material 19, and is generated to support the target object model 72. Next, the structure analysis processor 54 performs a displacement analysis on the target object model 72 using a conventionally known displacement method performed with structure analysis software. FIG. 5C shows the results of the displacement analysis performed for the first time. FIG. 5C represents portions A and B, which are significantly displaced, with dashed circles. A portion significantly displaced is structurally weak and is expected to be significantly deformed by the weight thereof during baking. Next, the main computation processor 53 generates support pillar portions 74b1 in portions A and B determined to be significantly displaced by the displacement analysis performed for the first time (see FIG. 6A). In this example, the support pillar portions 74b1 are generated at four corners of the target object model 72.

Figure 6A:
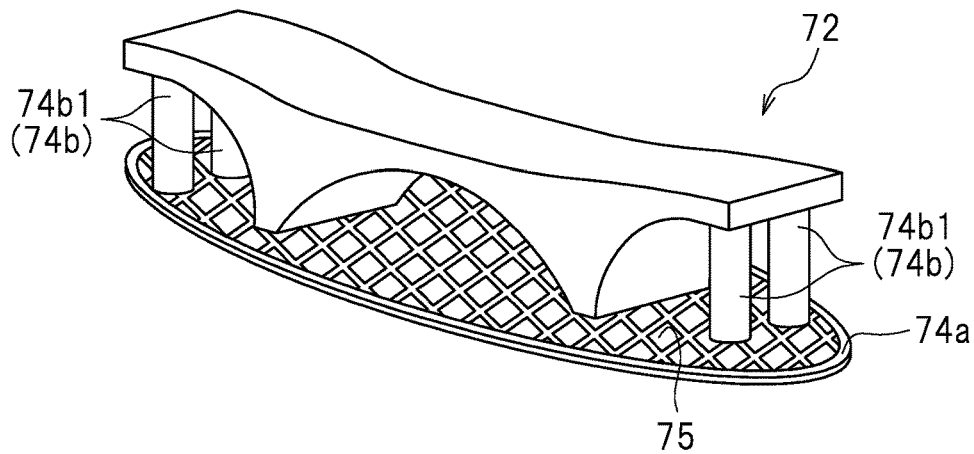
FIG. 6A shows an example of positions of first support pillar portions in a method for generating a support model according to a preferred embodiment of the present invention.
Figure 6B:
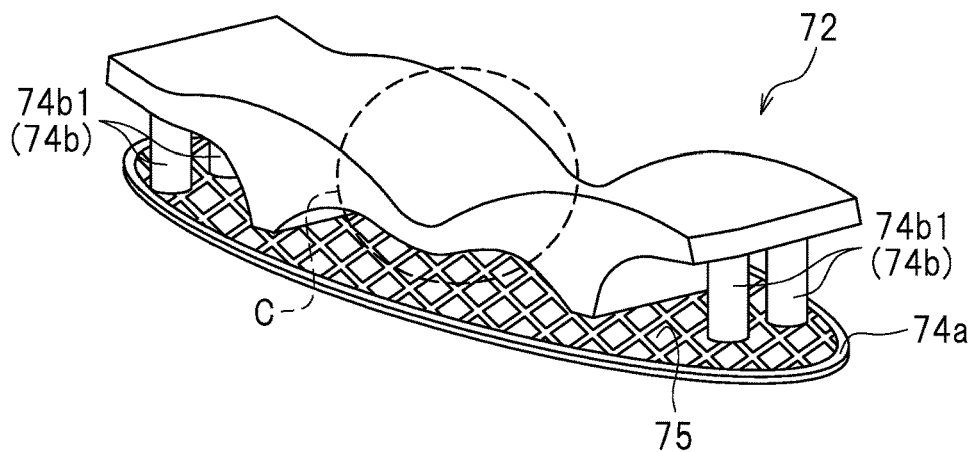
FIG. 6B shows the results of a displacement analysis performed for the second time in a method for generating a support model according to a preferred embodiment of the present invention.
Figure 6C:
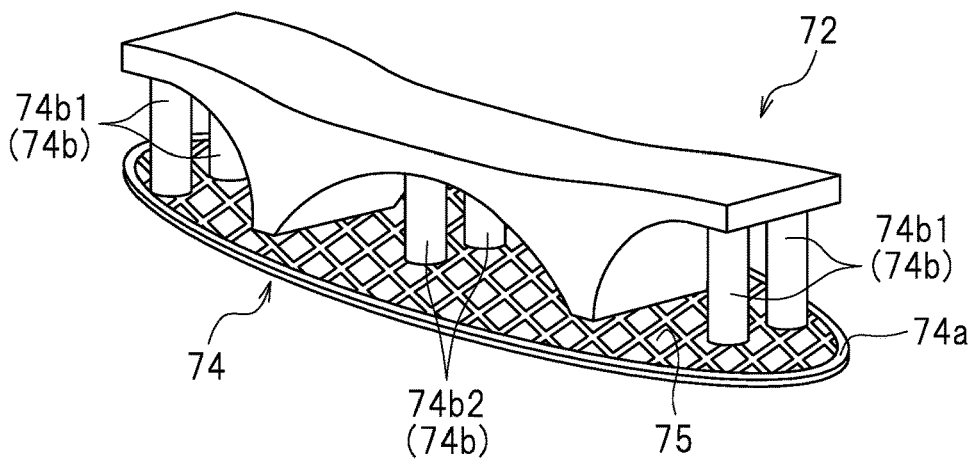
FIG. 6C shows an example of positions of second support pillar portions in a method for generating a support model according to a preferred embodiment of the present invention.

Next, the structure analysis processor 54 performs a displacement analysis again on the target object model 72 provided with the four support pillar portions 74b1. FIG. 6B shows the results of the displacement analysis performed for the second time. FIG. 6B represents portion C, which is significantly displaced, with a dashed circle. Next, the main computation processor 53 generates support pillar portions 74b2 in portion C determined to be significantly displaced by the displacement analysis performed for the second time (see FIG. 6C). In this example, two support pillar portions 74b2 are generated in a central or substantially central portion of the target object model 72. The displacement analysis performed by the structure analysis processor 54 and the generation of the support pillar portions 74b performed by the main computation processor 53 are repeated a plurality of times (e.g., two to five times). As a result, the support model 74 preventing, at a high degree, the three-dimensional object 181 from being deformed during baking is generated.

In a preferred embodiment of the present invention, the support model 74 is located at a position discrete from, and thus out of contact with, the target object model 72 so as to allow the three-dimensional object 181 and the support 182 to be generated as separate three-dimensional items. In an example, after the structure analysis processor 54 finishes adjusting the support pillar portions 74b in a state where the support model 74 is in contact with the target object model 72, the main computation processor 53 adds a space between all the surfaces of the support model 74 and the target object model 72 facing each other. More specifically, all the surfaces of the support model 74 and the target object model 72 that are in contact with each other are separated from each other by a predetermined distance by the main computation processor 53. Alternatively, the support model 74 may be vertically moved downward in the height direction. As a result, the support model 74 is generated in a separate position that is out of contact with the target object model 72.

In a state where the printing is finished and the support 182 supports the three-dimensional object 181, a substrate portion of the support 182 receives a load of the three-dimensional object 181 in addition to the weight of the support 182 itself (i.e., the weight of the handle portions and support pillar portions). In a preferred embodiment, with an assumption of such a situation, the structure analysis processor 54 is configured and/or programmed to perform a structure analysis on the support model 74 to evaluate the load strength. In the case where the load strength is less than, or equal to, a predetermined value, the shape, the size or the like of the support model 74 is readjusted. In an example, the substrate portion 74a is made thicker, or the size of the through-holes 75 is made smaller. In another example, the support pillar portions 74b are reinforced. Specifically, a member that reinforces the support pillar portions 74b1 and 74b2 of the support model 74 for the substrate portion 74a, for example, a beam or the like, is added. The predetermined value of the load strength may be a preset arbitrary value.

In the case where the support 182 is used as a deformation preventing member during baking, it is preferable that the size of the contact area of the three-dimensional object 181 and the support 182 when the support 182 supports the three-dimensional object 181 is small. This prevents the three-dimensional object 181 and the support 182 from forming an integral sintered body. This also makes it easy to separate the three-dimensional object 181 and the support 182 from each other. Thus, in a preferred embodiment, the support model generation processor 52 further includes the contact area size adjustment processor 55. The contact area size adjustment processor 55 is configured and/or programmed to adjust the contact area size of the support model 74 and the target object model 72 to be less than, or equal to, a predetermined value when the support model 74 supports the target object model 72. The predetermined value of the contact area size may be a preset arbitrary value.

In an example, first, the contact area size of the support model 74 and the target object model 72 is calculated when the support model 74 supports the target object model 72. In the case where the contact area size is less than, or equal to, the predetermined value, the contact area size adjustment processor 55 determines that it is not necessary to make any change to the support model 74 and finishes the adjustment. By contrast, in the case where the contact area size exceeds the predetermined value, the contact area size adjustment processor 55 adjusts the shape or the size of the support model 74 so as to decrease the contact area size. This adjustment may be made in consideration of, for example, the strength of the support model 74 or the stability of the target object model 72 when the target object model 72 is supported. When the contact area size becomes less than, or equal to, the predetermined value, the adjustment is finished.

Figure 7A:
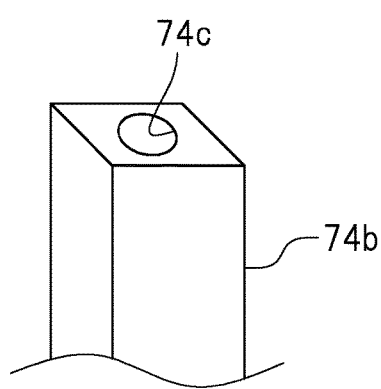
FIG. 7A is a schematic view showing an example in which a support pillar portion is provided with a recessed portion at a tip thereof according to a preferred embodiment of the present invention.
Figure 7B:
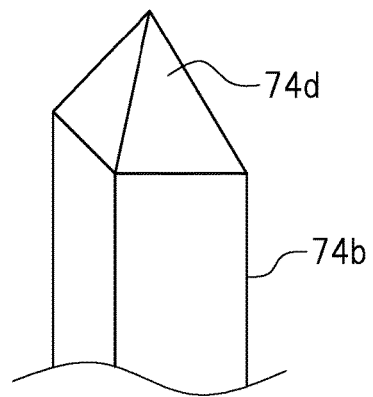
FIG. 7B is a schematic view showing an example in which a support pillar portion is provided with a pointed portion at a tip thereof according to a preferred embodiment of the present invention.

In a preferred embodiment, the contact area size adjustment processor 55 is configured and/or programmed to change the shape of a tip of each of the support pillar portions 74b at the side of the target object model 72. FIG. 7A and FIG. 7B are each a schematic view showing examples of the tip of the support pillar portion 74b. In FIG. 7A, a recessed portion 74c is generated in a surface of the support pillar portion 74b at the side of the target object model 72. In the recessed portion 74c, an aggregate may be installed. The aggregate is formed as a result of aggregation or integration of a material having a melting point higher than that of the powder material 19 (such a material having a higher melting point will be referred to as a "high melting point material"). The aggregate is, for example, a ceramic bead formed of zirconia or the like. During baking the three-dimensional object 181, an aggregate of the high melting point material is installed in the recessed portion 74c so that the three-dimensional object 181 and the support 182 are coupled with each other via the aggregate. With such an arrangement, the three-dimensional object 181 and the support 182 are prevented from directly contacting each other and are maintained as separate three-dimensional items in a preferable manner even after the baking.

In FIG. 7B, a pointed portion (convex portion) 74d is generated on the surface of the support pillar portion 74b at the side of the target object model 72. In other words, the tip of the support pillar portion 74b at the side of the target object model 72 is pointed at a sharp angle. The pointed portion 74d protrudes toward the target object model 72. The support pillar portion 74b is thinner the closer to the tip.

With such an arrangement, the three-dimensional object 181 and the support 182 are prevented from forming an integral sintered body. Thus, the three-dimensional object 181 and the support 182 are maintained as separate three-dimensional items in a preferable manner even after the baking.

The color determination processor 57 is configured and/or programmed to determine color data of the support model 64 based on color data of the target object model 62 stored in the storage 50. In an example, the color determination processor 57 is configured and/or programmed to select a color different from the color of the powder material 19 (e.g., selects a color other than white) and provide the support model 64 with the selected color. In another example, the color determination processor 57 is configured and/or programmed to select a color that is not used for the target object model 62 and provide the support model 64 with the selected color. In still another example, the color determination processor 57 is configured not to use, for the support model 64, any color used for the target object model 62. The color determination processor 57 may be set to color the entirety of the support model 64 or may be set to color a portion of the support model 64. In the example shown in FIG. 4B, top end portions 64t of the two handle portions 64c in the height direction are colored. This allows the support 182 to be distinguished easily in the unsolidified powder material 19.

In a preferred embodiment of the present invention, the support model generation processor 52 is configured and/or programmed to check whether or not the target object model 62 and the support model 64 are located at discrete positions from each other. In the case where the target object model 62 and the support model 64 overlap each other or contact each other, the support model generation processor 52 makes a readjustment such that the target object model 62 and the support model 64 are located at discrete positions from each other. In an example, first, the support model generation processor 52 moves the support model 64 vertically downward in the height direction. Next, the support model generation processor 52 checks whether or not the target object model 62 and the support model 64 are located at discrete positions from each other. Next, in the case where the target object model 62 and the support model 64 overlap each other or contact each other, the support model generation processor 52 readjusts the shape or the size of the support model 64. In the case where the above-described readjustment is regarded as not possible in consideration of, for example, the shape, the size or the like of the printing tank 33 or the printing table 32, the support model generation processor 52 may re-generate the support model 64.

In this manner, the support model 64 corresponding to the desired target object model 62 is generated. Thus, three-dimensional printing data including the target object model 62 and the above-generated support model 64 is generated. The three-dimensional printing data is transmitted to the three-dimensional printing device 10A from the output processor 58 of the three-dimensional printing data generation device 100. Based on the three-dimensional printing data, the three-dimensional printing device 10A prints the desired three-dimensional object 181 and the support 182 assisting the pick up of the three-dimensional object 181.

As shown in FIG. 1, when the printing is finished, the desired three-dimensional object 181 is buried in the unsolidified powder material 19 in the printing tank 33 together with the support 182. The support 182 includes the handle portions 64c and thus is printed to be easily found in the unsolidified powder material 19. For picking up the desired three-dimensional object 181, the user, for example, holds the handle portions 64c or couples an assisting tool to the handle portions 64c to move the support 182 upward in the printing tank 33. Then, the three-dimensional object 181 is pulled up from the printing tank 33 as being supported by the support 182.

The support 182 is provided with the through-holes 65, each of which is larger than the particle diameter of the powder material 19. Therefore, the support 182 works as a so-called "sieve". Namely, when the support 182 is pulled up, the unsolidified powder material 19 naturally falls through the through-holes 65 and is sieved out. Even a tiny amount of the powder material 19 left on the support 182 is eliminated in a preferable manner by, for example, the user swinging the support 182 left and right while holding the handle portions 64c. Therefore, the technology disclosed herein allows the user to pull up the three-dimensional object 181 from the unsolidified powder material 19 by use of the support 182 and thus to easily separate the unsolidified powder material 19 from the desired three-dimensional object 181 (to easily de-powder the desired three-dimensional object 181). The user does not need to directly contact the three-dimensional object 181 to pick up or de-powder the three-dimensional object 181. Therefore, as compared with the case where the three-dimensional object 181 is de-powdered by use of, for example, a brush or a blower, the three-dimensional object 181 is better prevented from being destroyed.

As described above, the three-dimensional printing data generation device 100 in this preferred embodiment generates three-dimensional printing data usable to print the desired three-dimensional object 181 and also the support 182 having a shape of a "sieve with handles". The three-dimensional printing system 10 in this preferred embodiment improves the ease of operation of picking up and de-powdering the printed three-dimensional object 181. Thus, the convenience for the user is improved.

In this preferred embodiment, as shown in FIG. 4B, the substrate portion 64a is located at a position discrete from the target object model 62. This allows the three-dimensional object 181 and the support 182 to be printed as discrete three-dimensional items. Therefore, it is not necessary to separate the three-dimensional object 181 and the support 182 from each other after the printing is finished. This improves the convenience for the user.

In this preferred embodiment, the level of the top ends of the handle portions 64c is higher than, or equal to, the level of the top end of the target object model 62. This allows the top end of the support 182 to be located in the surface region of the unsolidified powder material 19. Thus, the support 182 is found easily.

In this preferred embodiment, the handle portions 64c preferably are rod-shaped, for example. The handle portions 64c include the first rod 64c1 located at the side of the target object model 62 as seen in a plan view and the second rod 64c2 located at the opposite position to the first rod 64c1 with respect to the target object model 62 as seen in a plan view. This allows the user to hold the handle portions 64c easily, and further improves the convenience for the user during pulling up and de-powdering.

In this preferred embodiment, the top end portions 64t of the handle portions 64c are colored differently from the powder material 19. This allows the support 182 to be distinguished easily in the unsolidified powder material 19. Thus, the support 182 is found easily.

In this preferred embodiment, at least a portion of the substrate portion 64a is meshed. This allows the support 182 to be printed to be like a "sieve". Therefore, the unsolidified powder 19 falls more easily through the openings of the mesh, and the three-dimensional object 181 is de-powdered more easily.

In this preferred embodiment, the support model 64 includes the support pillar portions 64b located below the target object model 62 and extending upward from the substrate portion 64a. This improves the stability of the three-dimensional object 181 supported by the support 182. The support pillar portions 64b also prevent the three-dimensional object 181 from being deformed or destroyed during baking and allows the three-dimensional object 181 to be maintained in a predetermined shape in a preferable manner. Thus, the printing precision especially in the height direction is improved.

In this preferred embodiment, as shown in FIG. 3, the support model generation processor 52 includes the structure analysis processor 54 performing a structure analysis on the target object model 62 and the support model 64 in a state where the target object model 62 is placed on the support model 64. This prevents the three-dimensional object 181 from being deformed or destroyed during baking and allows the three-dimensional object 181 to be maintained in a predetermined shape in a preferable manner. Thus, the printing precision especially in the height direction is improved.

In this preferred embodiment, as shown in FIG. 3, the support model generation processor 52 includes the contact area size adjustment processor 55 adjusting the shape of the support model 64 such that the contact area size of the support model 64 and the target object model 62 is less than, or equal to, a predetermined value in a state where the target object model 62 is placed on the support model 64. In a preferred embodiment, as shown in FIG. 7A, the contact area size adjustment processor 55 forms the recessed portion 74c in the surface of the support model 64 at the side of the target object model 62 to adjust the shape of the support model 64. In another preferred embodiment, as shown in FIG. 7B, the contact area size adjustment processor 55 adds the pointed portion 74d on the surface of the support model 64 at the side of the target object model 62 to adjust the shape of the support model 64. With such an arrangement, when the three-dimensional object 181 and the support 182 are baked in a state where the three-dimensional object 181 is placed on the support 182, the desired three-dimensional object 181 is prevented from being deformed and the three-dimensional object 181 and the support 182 are maintained as separate three-dimensional items in a preferable manner. More specifically, the contact area size of the three-dimensional object 181 and the support 182 during baking is decreased to prevent the three-dimensional object 181 and the support 182 from forming an integral sintered body.

The three-dimensional printing system 10 and the three-dimensional printing data generation device 100 according to preferred embodiments of the present invention are described above. The three-dimensional printing systems and the three-dimensional printing data generation devices according to the present invention are not limited to the above preferred embodiments. For example, in the preferred embodiment shown in FIG. 1, the three-dimensional printing device 10A preferably includes the ink head 14 and the three-dimensional printing data generation device 100 preferably includes the color determination processor 57, for example. The three-dimensional printing device 10A does not need to include the ink head 14. The three-dimensional printing data generation device 100 does not need to include the color determination processor 57. In the case where the three-dimensional printing device 10A does not include the ink head 14 and the three-dimensional printing data generation device 100 does not include the color determination processor 57, the three-dimensional object and the support have the color of the powder material itself.

In the preferred embodiment shown in FIG. 4B, the target object model 62 and the support model 64 preferably are located at discrete positions from each other so that the three-dimensional object 181 and the support 182 are generated as separate three-dimensional items. However, the three-dimensional object 181 and the support 182 may be printed integrally. Namely, the support model 64 and the target object model 62 may be coupled with each other in the three-dimensional printing data. In this case, the support 182 may be cut away from the three-dimensional object 181 by a tool such as a nipper or the like after the printing is finished. In, for example, the preferred embodiment shown in FIG. 5A to FIG. 5C, FIG. 6A to FIG. 6C, FIG. 7A and FIG. 7B, the three-dimensional object 181 is baked at a temperature higher than the melting point of the powder material 19. The three-dimensional object may be, or may not be, baked.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A three-dimensional printing system comprising:
a three-dimensional printing data generation device; and
a three-dimensional printing device, wherein
the three-dimensional printing device includes:
   a printing processor that accommodates a powder material including particles having a particle diameter;
   a powder material supply that supplies the powder material to the printing processor;
   a binder supply head that atomizes a binder toward the powder material accommodated on the printing processor; and
   a controller;
the three-dimension printing data generation device includes:

a memory that stores data of a three-dimensional target object model representing the three-dimensional object;

a support model generation processor configured to generate, based on the data stored in the memory, data of a three-dimensional support model; and an output processor configured to output the data of the three-dimensional target object model and the data of the support model as three-dimensional printing data to the controller;

the data of the three-dimensional support model includes:

a substrate portion located below the three-dimensional target object model at a first discrete position spaced from the target object model such that the substrate portion is out of contact with the target object model and including at least one through-hole larger than the particle diameter of the particles of the powder material; and and a handle portion extending upward from the substrate portion, located at a second discrete position spaced from the target object model such that the handle portion is out of contact with the target object model, and including a top end that is located at a level higher than a level of a top end of the three-dimensional target object model;

the controller is configured to control the printing processor, the powder material supply, and the binder supply head based on the received three-dimensional printing data;

the three-dimensional printing device is configured to print a three-dimensional object based on the three-dimensional target object model and a support based on the three-dimensional support model, the support includes the substrate portion and the handle portion;

the handle portion and the substrate portion of the support are configured to facilitate lifting and removal of the three-dimensional object from the printing processor; and at least portion of unsolidified particles of the powder material are configured to pass through the least one through-hole of the substrate portion when the three-dimensional object is lifted from the printing processor via the handle portion.

2. The three-dimensional printing system according to claim 1, wherein the handle portion is rod-shaped.

3. The three-dimensional printing system according to claim 2, wherein the handle portion includes a first rod located to a side of the target object model as seen in a plan view and a second rod located at a position opposite to the first rod with respect to the target object model as seen in the plan view.

4. The three-dimensional printing system according to claim 1, wherein a top end portion of the handle portion is colored differently from the powder material.

5. The three-dimensional printing system according to claim 1, wherein at least a portion of the substrate portion has a mesh structure.

6. The three-dimensional printing system according to claim 1, wherein the support model generation processor includes a structure analysis processor configured and/or programmed to perform a structure analysis on the target object model and the support model in a state where the target object model is placed on the support model.

7. The three-dimensional printing system according to claim 1, wherein the support model includes a support pillar portion located below the target object model and extending upward from the substrate portion.

8. The three-dimensional printing system according to claim 1, wherein the support model generation processor includes a contact area size adjustment processor configured and/or programmed to adjust a shape of the support model such that a size of a contact area of the support model and the target object model is less than, or equal to, a value in a state where the target object model is placed on the support model.

9. The three-dimensional printing system according to claim 8, wherein the contact area size adjustment processor is configured or programmed to adjust the shape of the support model by forming a recessed portion in a surface of the support model at the side of the target object model.

10. The three-dimensional printing system according to claim 8, wherein the contact area size adjustment processor is configured or programmed to adjust the shape of the support model by adding a pointed portion on a surface of the support model at the side of the target object model.

11. The three-dimensional printing system according to claim 1, wherein the particle diameter of the particles of the powder material is determined by an average particle diameter between about 50% volume-based cumulative average particle diameter ($D_{50}$) and about 95% volume-based cumulative particle diameter ($D_{95}$).

12. The three-dimensional printing system according to claim 1, wherein a diameter of the through-hole is set by the three-dimension printing data generation device to be between ten times the particle diameter of the particles of the powder material and one hundred times the particle diameter of the particles of the powder material.

13. The three-dimensional printing system according to claim 1, wherein the printing processor includes:

a printing tank that accommodates the powder material;

a printing table defining a lower surface of the printing tank; and a table elevator that moves the printing table upward or downward inside the printing tank.

* * * * *